US009614230B2

(12) United States Patent
Schrooten et al.

(10) Patent No.: US 9,614,230 B2
(45) Date of Patent: Apr. 4, 2017

(54) PERIMETER COUPLING FOR PLANAR FUEL CELL AND RELATED METHODS (71) Applicant: Intelligent Energy Limited, Leicestershire (GB)

(72) Inventors: Jeremy Schrooten, Mission (CA); Ales Horky, North Vancouver (CA); Paul Sobejko, Monroe, CT (US); Robert J. Porter, Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 251 days.

(21) Appl. No.: 14/359,034

(22) PCT Filed: Nov. 16, 2012

(86) PCT No.: PCT/US2012/065685
§ 371 (c)(1),
(2) Date: May 16, 2014

(87) PCT Pub. No.: WO2013/075032
PCT Pub. Date: May 23, 2013

(65) Prior Publication Data
US 2014/0329170 A1    Nov. 6, 2014

Related U.S. Application Data (60) Provisional application No. 61/561,629, filed on Nov. 18, 2011.

(51) Int. Cl.
*H01M 8/02*     (2016.01)
*H01M 8/24*     (2016.01)
(Continued)

(52) U.S. Cl.
CPC ......... *H01M 8/006* (2013.01); *H01M 8/0273* (2013.01); *H01M 8/0276* (2013.01);
(Continued)

(58) Field of Classification Search
CPC .. H01M 8/006; H01M 8/0273; H01M 8/0284; H01M 8/0297; H01M 8/2465;
(Continued)

(56) References Cited

U.S. PATENT DOCUMENTS 7,563,305 B2    7/2009  Zimmermann
2002/0187384 A1  12/2002  Kato et al.
(Continued)

FOREIGN PATENT DOCUMENTS

CN    101395735 A    3/2009
JP    S58-044672 A   3/1983
(Continued)

OTHER PUBLICATIONS

"International Application Serial No. PCT/US2012/065685, International Preliminary Report on Patentability mailed May 30, 2014", 7 pgs.
(Continued)

*Primary Examiner* — Kenneth Douyette
(74) *Attorney, Agent, or Firm* — Baker & Hostetler LLP (57) ABSTRACT The invention relates to methods and articles for coupling a fuel cell layer to a second structure. The fuel cell layer includes a superior fuel cell surface, an inferior fuel cell surface, and a perimeter fuel cell surface. An adhesive structure is adhered to the superior, inferior, and perimeter fuel cell surfaces to form a coupling or seal between the fuel cell layer and the second structure.

12 Claims, 8 Drawing Sheets

(51) Int. Cl.
*H01M 8/00* (2016.01)
*H01M 8/2465* (2016.01)
*H01M 8/2475* (2016.01)
*H01M 8/0273* (2016.01)
*H01M 8/0297* (2016.01)
*H01M 8/241* (2016.01)
*H01M 8/2485* (2016.01)
*H01M 8/0276* (2016.01)
*H01M 8/0286* (2016.01)
*H01M 8/0284* (2016.01)

(52) U.S. Cl.
CPC ....... *H01M 8/0286* (2013.01); *H01M 8/0297* (2013.01); *H01M 8/2415* (2013.01); *H01M 8/2465* (2013.01); *H01M 8/2475* (2013.01); *H01M 8/2485* (2013.01); *H01M 8/0284* (2013.01); *H01M 2250/30* (2013.01); *Y02B 90/18* (2013.01)

(58) Field of Classification Search
CPC ............. H01M 8/2475; H01M 8/0247; H01M 8/04208
See application file for complete search history.

(56) References Cited

U.S. PATENT DOCUMENTS

| | | |
|---|---|---|
| 2003/0124409 A1 | 7/2003 | Cramer et al. |
| 2004/0131915 A1* | 7/2004 | Sherman ............. H01M 8/0247 429/457 |
| 2004/0234831 A1 | 11/2004 | Kobayashi et al. |
| 2005/0250004 A1 | 11/2005 | McLean et al. |
| 2007/0042254 A1 | 2/2007 | Wozniczka et al. |
| 2007/0159799 A1 | 7/2007 | Dando, III et al. |
| 2007/0178335 A1 | 8/2007 | Zimmermann |
| 2007/0184330 A1 | 8/2007 | McLean et al. |
| 2007/0202378 A1 | 8/2007 | D'Urso et al. |
| 2007/0231664 A1 | 10/2007 | Zerfass et al. |
| 2008/0029156 A1* | 2/2008 | Rosal ................ H01M 8/04208 137/2 |
| 2008/0102344 A1 | 5/2008 | Shimizu |
| 2008/0311458 A1 | 12/2008 | Schrooten et al. |
| 2009/0023048 A1 | 1/2009 | Ohmori et al. |
| 2009/0081493 A1 | 3/2009 | Schrooten et al. |
| 2011/0003229 A1 | 1/2011 | Schrooten et al. |

FOREIGN PATENT DOCUMENTS

| | | |
|---|---|---|
| JP | 05-101837 A | 4/1993 |
| JP | 08-180888 A | 7/1996 |
| JP | 2002-367631 A | 12/2002 |
| JP | 2003123792 A | 4/2003 |
| JP | 2005-339891 A | 12/2005 |
| JP | 2006-092924 A | 4/2006 |
| JP | 2007-250249 A | 9/2007 |
| JP | 2009-043709 A | 2/2009 |
| JP | 2010-541136 A | 12/2010 |
| WO | WO-2011079377 A1 | 7/2011 |
| WO | WO-2013075032 A1 | 5/2013 |

OTHER PUBLICATIONS

"International Application No. PCT/US2012/065685, International Search Report mailed Feb. 6, 2013", 2 pgs.

"International Application Serial No. PCT/US2012/065685, Written Opinion mailed Feb. 6, 2013", 5 pgs.

European Patent Application No. 12850195.4; Extended Search Report; dated May 26, 2015; 11 pages.

* cited by examiner

FIG. 9B

PERIMETER COUPLING FOR PLANAR FUEL CELL AND RELATED METHODS

PRIORITY OF INVENTION

This application is a U.S. National Stage Filing under 35 U.S.C. 371 from International Application No. PCT/US2012/065685, filed on 16 Nov. 2012, and published as WO 2013/075032 A1 on 23 May 2013, which claims the benefit of priority to U.S. Provisional Patent Application No. 61/561,629, filed Nov. 18, 2011, which are herein incorporated by reference in their entireties.

FIELD OF THE INVENTION

The subject matter of the present invention relates to perimeter couplings for planar fuel cells and associated methods and articles.

BACKGROUND

Successive generations of portable electronic devices tend to trend smaller in size while provide increased performance. As electronic components are designed smaller in size and incorporate sophisticated and complex technology, the demands on the associated power supply usually increase. For instance, the power supply may need to occupy less volume or possess a smaller footprint so that the overall device can accommodate the additional technology or decrease in overall size. Further, the additional technology may require that the power supply last for longer periods of time or that power be delivered at uniform rates for steady electronic component performance.

One example of a power supply is a fuel cell system. A fuel cell system may include one or more fuel cell layers, each layer including one or more anodes and cathodes with an electrolyte membrane disposed between the anode(s) and cathode(s). A small, layered fuel cell system must be robust, while accommodating the reduced space requirements.

A need exists for small layered fuel cell systems that are robust while conforming to the reduced space requirements of modern portable electronic devices.

SUMMARY

In some embodiments, the present invention includes a fuel cell system comprising a fuel cell layer, a second structure, and an adhesive seal layer bonding the fuel cell layer to the second structure. The fuel cell layer can include a superior fuel cell surface, and inferior fuel cell surface, and a perimeter fuel cell surface. The second structure can be positioned inferior to the inferior fuel cell surface. The adhesive seal layer can adhere to a superior fuel cell surface bonding area, an inferior fuel cell bonding area, a perimeter fuel cell bonding area, and a second structure surface bonding area.

In some embodiments, the present invention includes methods of producing electricity using one of the fuel cell systems of the invention. The methods include providing one or more of the fuel cell systems of the invention, pressurizing an enclosure defined by a fuel cell layer and a second structure with a fluid fuel, and contacting the fluid fuel with the fuel cell layer to generate electricity.

In further embodiments, the present invention includes methods of manufacturing a fuel cell system. The methods include providing a fuel cell layer and a second structure positioned inferior to an inferior surface of the fuel cell layer. At least one portion of a coupling material is disposed onto the second structure to form a coupling layer. The coupling layer contacts and adheres to a superior fuel cell surface, a perimeter fuel cell surface, and a second structure surface.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" or "inferior" and "superior" may be used to describe two different surfaces of a composite. However, these terms are used merely for ease of description and are not to be understood as fixing the orientation of a fuel cell layer of the described embodiments. In the appended aspects or claims, the terms "first", "second" and "third", etc. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1-100 shall also include the ranges 1-80, 2-76, or any other numerical range that falls between 1 and 100.

Portable electronic devices (e.g., mobile phones, laptop computers, computer accessories, displays, personal audio or video players, medical devices, televisions, transmitters, receivers, lighting devices including outdoor lighting or flashlights, electronic toys, power tools or any device conventionally used with batteries) are trending to become smaller in size while increasing the demand for performance. Thus, fuel cell systems may need to occupy only a small volume of the overall electrical device volume. The drive for compact power sources requires that a fuel cell have a high specific power (i.e., power density) to provide the demanded power in the smallest possible space and maximize the volume available for fuel.

Preferably, in addition to being as small as possible, the fuel cell will also have an overall shape that is conducive to working well in a portable power application. The best shapes tend to be planar so that the fuel cell can be integrated as a power source without making large demands on the format of the overall system being supplied with power by the fuel cell. As fuel cells with high power output are configured in planar formats, the overall surface area of the fuel cell increases which tends to increase internally generated forces due to an increase in the amount of fluid contacting the fuel cell. These forces place stress on various parts of the planar fuel cell, such as perimeter seals used to hold the layers of the planar fuel cell together.

Fuel cell systems and methods that reduce volumetric requirements of fuel cell systems have been previously described in commonly-assigned U.S. Patent App. Pub. 2009/0081493, which was filed on 25 Sep. 2008 and entitled FUEL CELL SYSTEMS INCLUDING SPACE-SAVING FLUID PLENUM AND RELATED METHODS, the disclosure of which is incorporated herein in its entirety by reference.

Fuel cells for use in portable applications may have air breathing cathodes which are exposed to the ambient environment, either directly or via some low-pressure drop ducting. In order to drive fuel into the cell and sustain fuel consumption at high power operation, the fuel (which may be a gas or a liquid) may be maintained at some positive pressure relative to the outside environment. Therefore, the layered fuel cell structure contains a fuel plenum defined at least in part by the configuration of the layers, which must be sealed to prevent leakage of the fuel from the system.

Conventional face seals can be used to seal the perimeter of a fuel cell system, but require activation by the application of some force to the seal (i.e., the system must be clamped externally to prevent leakage). Alternatively, some self-supported fuel cell layers attempt to create a non-clamped seal using an adhesive sealing member. Such members are subject to significant peeling loads when the fuel plenum is pressurized. Withstanding such loads with a non-clamped seal is challenging, particularly when the fuel cell layer is made from a composite of different materials since the adhesive material may not adhere to the different materials with the same bonding force. Perfluorosulfonic acid (PFSA)-type membranes, for example, may be used for proton conduction and are challenging to seal to secondary structures using adhesive materials.

It is desirable to reduce the number of components in a fuel cell system, and therefore the system's overall size. For example, using improved perimeter seals can eliminate or reduce the need for external clamps or sealing means.

The present invention provides an improved perimeter coupling that allows a planar fuel cell to be made a larger size or to withstand a higher pressure. The present invention includes a fuel cell system comprising a self-supported perimeter coupling that can withstand applied forces without requiring any external supports or fixturing. The coupling acts as a sealing member and as a bonding member. The present invention provides a fuel cell system with increased mechanical robustness.

Definitions

As used herein, "adhesive material," "adhesive seal," or "bonding material" refer to a substance which unites to one or more components by a molecular force acting in the area of contact. Adhesive materials may include polyurethane, urethane, epoxy, polyamide, polyester, pressure sensitive adhesive, acrylic, cyanoacrylate, or combinations thereof.

As used herein, "coupling" refers to an implicit or explicit component that facilitates the bonding and sealing of two objects. In an example, an implicit coupling member may include a hermetic adhesive or weld that joins two objects. An explicit coupling member may include a mechanical fastener, for example. A coupling may include adhesive material.

As used herein, "flexible electrochemical layer" refers to an electrochemical layer that is flexible in whole or in part, so-as-to embrace, for example, an electrochemical layer having one or more rigid components integrated with one or more flexible components. A "flexible fuel cell layer" refers to a layer comprising one or more fuel cells integrated into the layer.

As used herein, "flexible two-dimensional (2-D) fuel cell array" refers to a flexible sheet which is thin in one dimension and which supports a number of fuel cells. A flexible two-dimensional fuel cell array may be an example of a flexible fuel cell layer. The fuel cells have active areas of one type (e.g. cathodes) that are accessible from one face or major surface of the sheet and active areas of another type (e.g. anodes) that are accessible from an opposed face or major surface of the sheet. The active areas may be disposed to lie within areas on their respective faces of the sheet (e.g. it is not mandatory that the entire sheet be covered with active areas, however, the performance of a fuel cell may be increased by increasing its active area). A 2-D fuel cell array can be flat or curved in shape.

As used herein, "planar fuel cell layer" refers to a fuel cell layer that is thin in one dimension. A planar fuel cell layer may include one unit fuel cell or more than one unit fuel cell. A planar fuel cell layer may be flexible or rigid and it may be flat or curved.

As used herein, "self-supported" refers to a component if, when coupled to a substrate, no external fixturing is required for their function.

As used herein, "substrate" refers to a component coupled to an electrochemical cell layer, sufficient to create an enclosed space. A substrate may include, among other things, a fluid manifold, a fuel cell system structural member, fluidic control components, fluid reservoir, a portion of an electronic device or a combination thereof. Fluidic control components may include pressure regulator devices, such as an array of regulators, for example.

In some embodiments, the present invention includes a perimeter seal or coupling between a planar fuel cell layer and a second structure. The perimeter seal or coupling member bonds the fuel cell layer to the second structure and adheres to both a superior and inferior surface of the cell layer. The inventive coupling member may bond the entire perimeter of a planar fuel cell layer to a second structure or it may bond some portion of the perimeter of the planar fuel cell layer (e.g., one, two, or three sides of a quadrilateral planar fuel cell layer). In some embodiments, a planar fuel cell layer may be bonded to a second structure on one, two, or three sides while the remaining side(s) of the fuel cell layer are bonded to the second structure using a conventional coupling means (e.g., a conventional face seal or an external clamping means).

Figure 1:
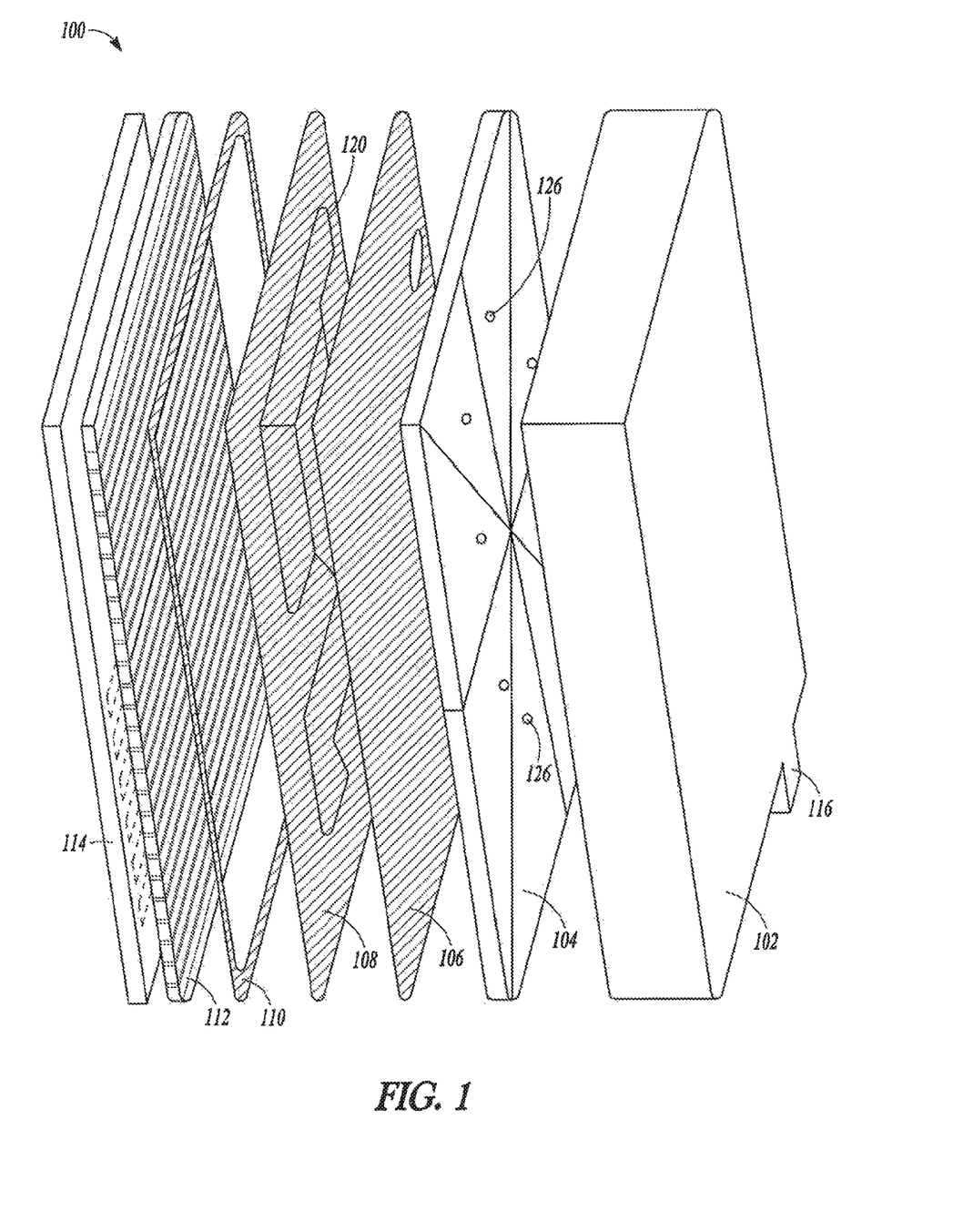
FIGS. 1 and 2 illustrate, respectively, an exploded view and a cross-section view of a fuel cell system.

FIG. 1 illustrates an exploded view of fuel cell system 100. System 100 includes fluid reservoir 102, optional fluid pressure regulator assembly 104, a manifold sealing layer 106, a manifold conduit layer 108, coupling member 110, fuel cell layer 112, and external support structure 114. Optional fluid pressure regulator assembly 104 includes pressure regulators or flow restrictors 126.

Fluid reservoir 102 provides fuel or other reactant fluid for fuel cell system 100 and can be charged or refuelled via charge port 116. Fluid reservoir 102 can comprise a cellular fuel tank, such as is described in commonly-owned U.S. Patent App. Pub. 2007/0178335, which was filed as U.S. application Ser. No. 11/621,501 on 9 Jan. 2007 and entitled "Cellular Reservoir and Methods Related Thereto," or one of the other fluid enclosures described in commonly-owned U.S. Pat. No. 7,563,305 by Zimmermann, et al. issued on 21 Jul. 2009 and entitled "Fluid Enclosure and Methods Related Thereto." The entire contents of these two documents are incorporated herein by reference.

A fluid manifold, which may include fluid pressure regulator assembly 104, manifold sealing layer 106, and manifold conduit layer 108, provides for the distribution, regulation, and transfer of fuel from fluid reservoir 102 to fuel cell layer 112. Fluid pressure regulator assembly 104 can control the fuel pressure coming out of fluid reservoir 102 by reducing a primary (higher) fluid pressure present therein to a more constant secondary (lower) fluid pressure for delivery to the fuel cell layer 112.

The various parts of the fluid manifold are in fluid communication with fuel cell layer 112 via material directing recess 120. Material directing recess 120 of the fluid manifold directs the flow of fuel from fluid distribution assembly 104 to a region adjacent to fuel cell layer 112, and can be formed by creating one or more channels in manifold conduit layer 108. The fluid manifold of system 100 has a layered structure that allows for the manifold to be of a size that does not take up unnecessary volume nor an unnecessarily large footprint, yet allows for the pressure, volume, or temperature requirements for fuel cell systems 100 to be met. While FIG. 1 illustrates one embodiment of a fluid manifold, the present invention may include other forms of fluid manifolds, such as those described in commonly-owned U.S. Pat. App. Pub. 2008/0211458, which was filed as U.S. patent application Ser. No. 12/053,366 on 21 Mar. 2008 and entitled "Fluid Manifold and Methods Therefore." The entire teachings of this document are incorporated herein by reference.

Fuel cell layer 112 includes fuel cell layers (i.e., comprising at least one anode and cathode) with an electrolyte interposed therebetween. Fuel cell layer 112 utilized in the system 100 can be a planar fuel cell, as described in commonly-owned U.S. Patent App. Pub. No. 2005/0250004, which was filed on 2 Feb. 2005 as U.S. application Ser. No. 11/047,560 and entitled "ELECTROCHEMICAL CELLS HAVING CURRENT-CARRYING STRUCTURES UNDERLYING ELECTROCHEMICAL REACTION LAYERS", the entire teachings of which are incorporated herein by reference.

Figure 2:
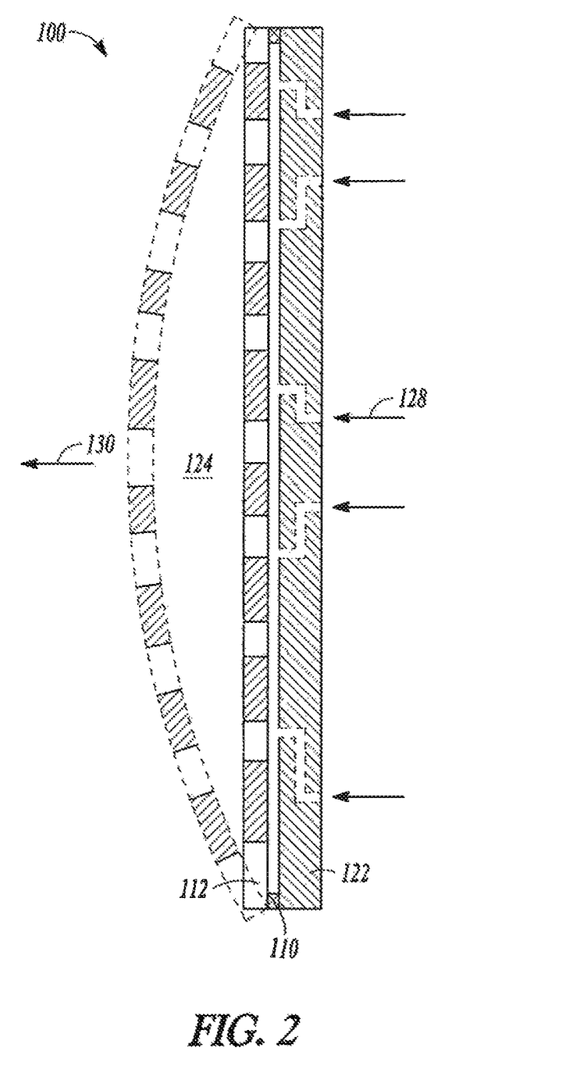

FIG. 2 illustrates a cross-sectional view of a portion of system 100 which includes fuel cell layer 112 coupled to fluid manifold 122 via perimeter coupling member 110. For clarity, the substituent parts or layers of fluid manifold 122 are not illustrated in FIG. 2. Enclosed region 124 is a fluid plenum and is defined by fuel cell layer 112, coupling member 110, and fluid manifold 122. During use, the volume of enclosed region 124 grows larger due to in-flows of fluid 128 which increases the pressure inside fuel cell layer 112 relative to the outside pressure. Inflowing fluid 128 forces flexible fuel cell layer 112 to bow away from fluid manifold 122 in direction 130. Perimeter coupling member 110 maintains a hermetic seal between fluid manifold 122 and fuel cell layer 112. In some embodiments, additional couplings between the fuel cell layer and the manifold may be included to reduce the stress on the perimeter coupling. However, even with these additional couplings, the perimeter coupling is subject to the loads created when the system is pressurized and the fuel cell layer bows away from the manifold.

Figure 3:
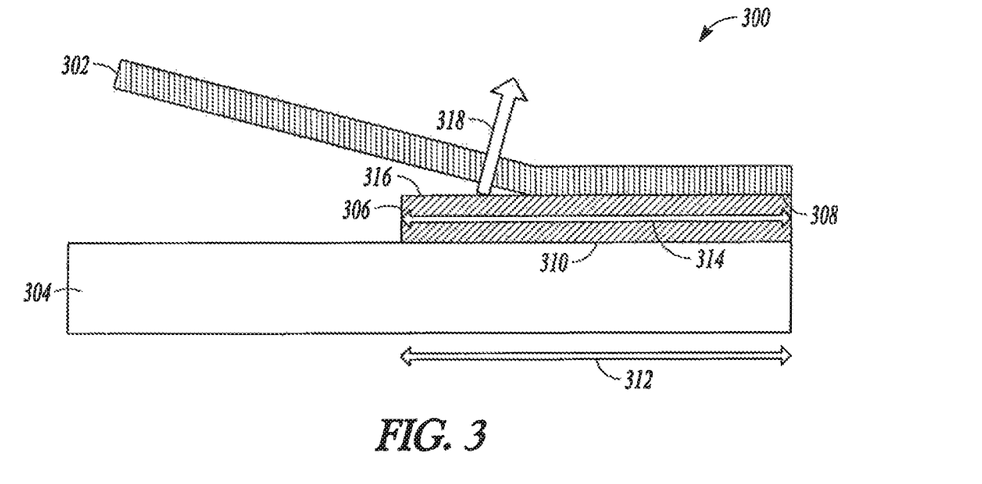
FIG. 3 illustrates a cross-section view of a portion of a system that includes a conventional adhesive coupling layer.

FIG. 3 illustrates a cross-section view of a portion of system 300. System 300 includes planar fuel cell layer 302 and a second structure in the form of manifold 304, both bonded together conventionally with adhesive coupling layer 306. Adhesive coupling layer 306 lies between layer 302 and manifold 304. Adhesive coupling layer 306 contacts and is bonded to a portion of the perimeter of the inferior side of fuel cell layer 302 to form inferior fuel cell surface bonding area 308. Adhesive coupling layer 306 also contacts and is bonded to a portion of the perimeter of the superior side of fluid manifold 304 to form second structure surface bonding area 310. Bonding area 310 has a length 312.

Bonding area 308 initially has a length 314, but during pressurization of system 300, fuel cell layer 302 deflects away from manifold 302 and places tensile and peeling load 318 on the superior surface of adhesive coupling layer 306. If great enough, load 318 can cause a portion of the inferior surface of fuel cell layer 302 to peel away or delaminate from adhesive coupling layer 306, thereby separating upper surface 316 of adhesive coupling layer 306 from the inferior surface of fuel cell layer 302 and decreasing the size of inferior fuel cell surface bonding area 308. Hence, the strength of the conventional bond formed by adhesive coupling layer 306 is determined by the ability of coupling layer 306 to resist load 318 along length 310. If the bond fails, the path length for a fluid leak is length 314 of inferior fuel cell surface bonding area 308, which is approximately equal to length 312 prior to any peeling or delaminating.

In the present invention, a perimeter coupling may be formed between a planar fuel cell layer and a second structure such as a fluid manifold. The coupling may extend around the entire perimeter of the assembly or it may also be placed intermittently. In some embodiments, the perimeter coupling includes the inventive coupling along two edges of the fuel cell system while some other method is used to couple the other two edges of the fuel cell system (e.g., a conventional coupling or an external coupling may be used to seal the other two edges of the system).

Figure 4:
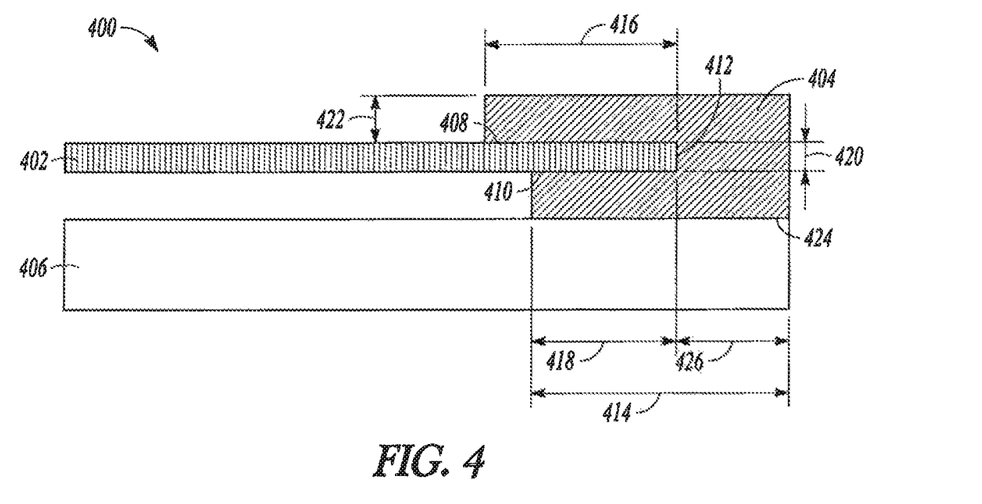
FIG. 4 illustrates a cross-section view of a portion of a system that includes a coupling layer encapsulating an edge of a fuel cell layer on both major sides.

FIG. 4 illustrates one embodiment of the present invention that includes a portion of fuel cell system 400 in a depressurized state. System 400 includes fuel cell layer 402, coupling layer 404, and second structure 406. Second structure 406 may be a fluid manifold.

Coupling layer 404 contacts and adheres to a portion of the superior surface of fuel cell layer 402 to form superior fuel cell surface bonding area 408 having length 416. Coupling layer 404 also contacts and adheres to a portion of the inferior surface of fuel cell layer 403 to form inferior fuel cell surface bonding area 410 having length 418. Coupling layer 404 also contacts and adheres to the later or vertical surface of the perimeter of fuel cell layer 402 to form perimeter fuel cell surface bonding area 412 having length 420 (approximately equal to the thickness of fuel cell layer 402). Coupling layer 404 also contacts and adheres to a superior surface of second structure 406 to form second structure surface bonding area 424. In this way, coupling layer 404 encapsulates an edge of fuel cell layer 402 on both major sides.

In FIG. 4, length 416 of bonding area 408 is greater than length 418 of bonding area 410. However, in some embodiments of the invention, the length of the superior fuel cell surface bonding area is equal to or less than the length of the inferior fuel cell surface bonding area.

The path length for a fluid leak is the sum of length 416, length 418, and length 420. Hence, one advantage of the present invention is that it provides a perimeter coupling having a much longer leak path length than those offered by conventional bonds (e.g., the one shown in FIG. 3). To fail, a leak must propagate through the sum of those three lengths of an inventive coupling before the perimeter bond will fail.

The strength of coupling layer 404 is dependent on its material properties. Any material that has a good adhesion to the materials used in the fuel cell system may be used to form the perimeter coupling layer. Such materials may contain polyurethane, epoxy, or polyamide for example.

The strength of coupling layer 404 is also a function of its geometry. For example, the thickness 422 and length 416 of the upper portion of layer 404, which forms superior fuel cell surface bonding area 408, can affect the strength of layer 404. Also, length 414 of second structure surface bonding area 424 and length 420 of perimeter fuel cell surface bonding area 412 can affect the strength of layer 404, as can width 426 of the portion of coupling layer 404 that spans from the inferior to the superior sides of fuel cell layer 402. Depending upon the demands of a given application, these and other dimensions of a coupling layer of the invention can be varied to produce a perimeter bond having the desired strength properties.

While the dimensions of the inventive coupling member can be varied as desired to suit a given application, in some embodiments, the length of the second structure surface bonding area (corresponding to length 414 illustrated in FIG. 4) is about 1.9 mm±40%, the length of the inferior fuel cell surface bonding area (corresponding to length 418) is about 0.9 mm±40%, and the length of the superior fuel cell surface bonding area (corresponding to length 416) is about 1.25 mm±40%. In some embodiments, the coupling member has a total thickness (corresponding to the sums of thickness 422, length 420, and the shortest distance between inferior fuel cell surface 410 and second structure surface bonding area 424) of about 1.2 mm±40%.

Figure 5:
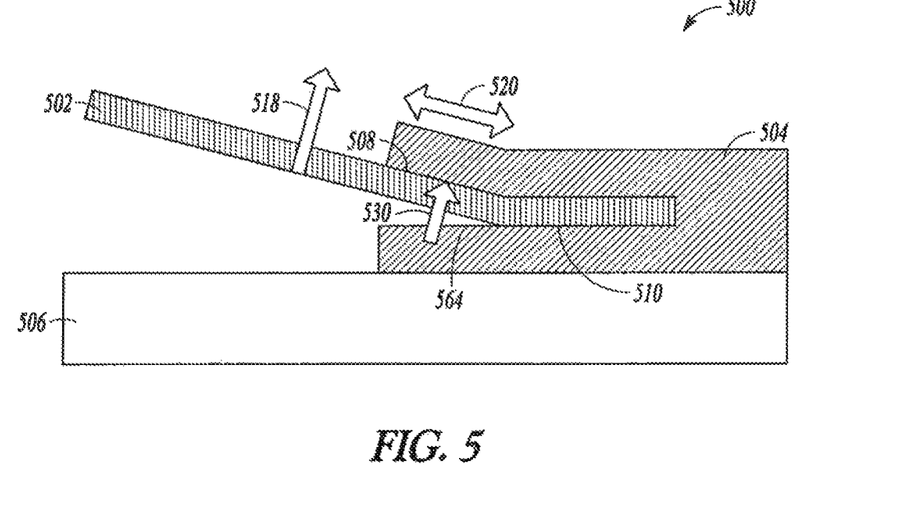
FIG. 5 illustrates a cross-section view of a portion of a system that includes a fuel cell system in a pressurized state.

FIG. 5 illustrates another embodiment of the invention that includes a portion of fuel cell system 500 in a pressurized state. Fuel cell system includes fuel cell layer 502, coupling layer 504, and second structure 506. Coupling layer 504 envelopes a perimeter of fuel cell layer 502 and bonds layer 502 with second structure 506. Fuel cell layer 502 has been pressurized and deflects away from second structure 506.

Inferior fuel cell surface bonding area 510 of coupling layer 504 experiences tensile and peeling loads 518, while superior fuel cell surface bonding area 508 of coupling layer 504 experiences shear stress 520 and a compressive load 530 exerted by fuel cell layer 502. As illustrated in FIG. 5, tensile and peeling loads 518 have caused a portion of the inferior fuel cell surface to peel away or delaminate from coupling layer 504, exposing surface 564. While tensile and peeling loads 518 have caused peeling of surface 564, the compressive load on superior fuel cell surface bonding area 508 helps to maintain bonding.

Compared to a simple conventional adhesive face bond, a perimeter coupling of the present invention has an increased bond length, allowing for a greater bond surface area. In order for the fuel cell system to leak, the adhesive of the perimeter coupling must fail at both the superior and inferior surfaces of the fuel cell layer. Because the shear strength of the materials used in the inventive coupling may be about 10 times greater than their peel strength, the integrity of the perimeter coupling is not dependent on the tensile or peeling loads, but rather on the shear stress (e.g., the sheer stress 520 shown in FIG. 5).

Figure 6A:
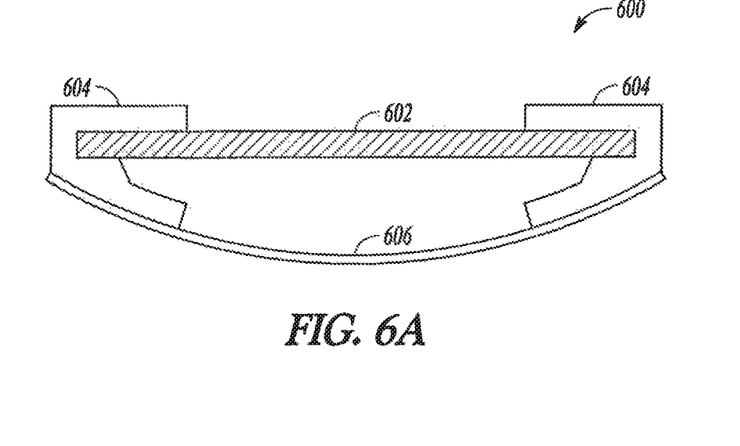
FIGS. 6A-6C illustrate cross-sectional views of various arrangements of fuel cell layers having the inventive coupling members described herein.
Figure 6B:
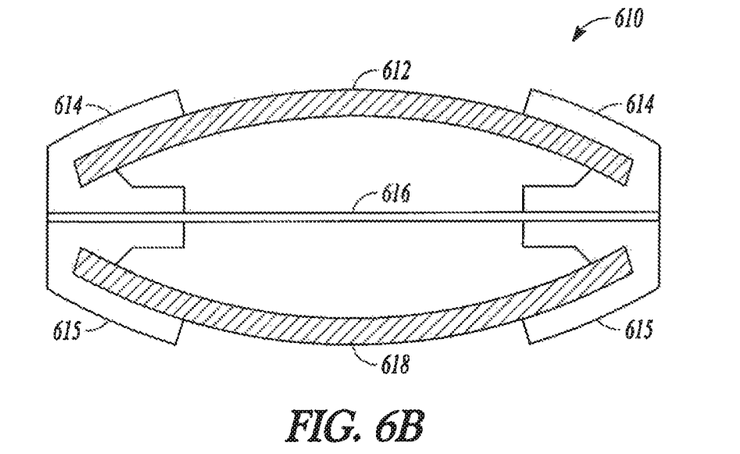
Figure 6C:
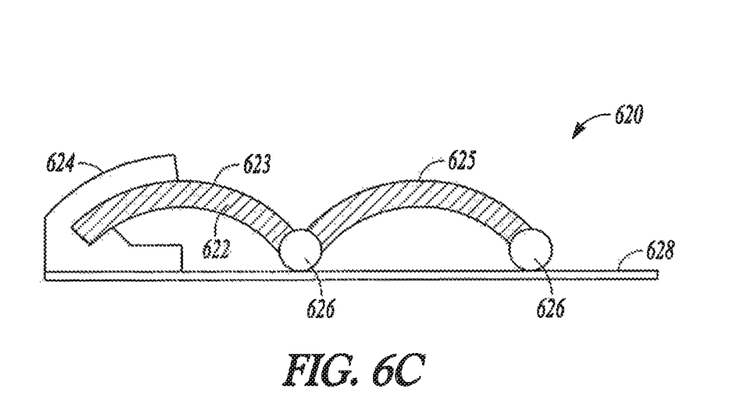

The perimeter couplings of the present invention can be used with various fuel cell layer and fluid manifold configurations to prevent rupture of the assembly, including configurations that include internal support structures (e.g., bond members, spacers, collapsible columns, or the like, that are intended to restrict the outward expansion of the fuel cell layer in the assembly) or configurations that include rigid or flexible fuel cells and/or second structures. FIGS. 6A-6C illustrate additional cross-sectional views of various arrangements of fuel cell layers having the inventive coupling members described herein (some aspects of the nature of the contact between the coupling members and the fuel cell layers have been omitted for clarity).

While the second structure may in some embodiments be rigid, in other embodiments it is flexible. FIG. 6A illustrates one embodiment of the invention that includes a portion of pressurized fuel cell system 600 having flexible second structure 606. System 600 includes flexible second structure 606, coupling member 604, and rigid fuel cell layer 602. Flexible second structure 606 is a portion of a fluid manifold. Coupling member 604 envelopes both sides of an outer peripheral portion of rigid fuel cell layer 602 and bonds layer 602 to structure 606.

FIG. 6B illustrate one embodiment of the invention that includes a portion of fuel cell system 610 in a pressurized state. Fuel cell system 610 includes two flexible fuel cell layers 612 and 618, each disposed on opposing sides of second structure 616. Coupling member 615 adheres layer 618 to structure 616, while coupling member 614 adheres layer 612 to an opposing surface of structure 616. Second structure 616 may be rigid or flexible.

FIG. 6C illustrates one embodiment of the invention that includes a portion of fuel cell system 620. System 620 includes fuel cell layer 622, coupling member 624, and second structure 628. Coupling member 624 bonds a peripheral portion of layer 622 to structure 616. Layer 622 is also adhered to structure 628 by internal supports in the form of bond members 626. Bond members 626 restrict the outward expansion of fuel cell layer 622 at various points across its length.

Configurations of potential fuel cell layers and second structures (e.g., fluid manifolds) are further described in commonly-assigned U.S. Patent Appl. Pub. 2009/0081493, mentioned above.

Any manufacturing process that is suitable for the adhesive of choice may be used to form the inventive perimeter seals. Such processes may include syringe deposition or screen printing.

Figure 7A:
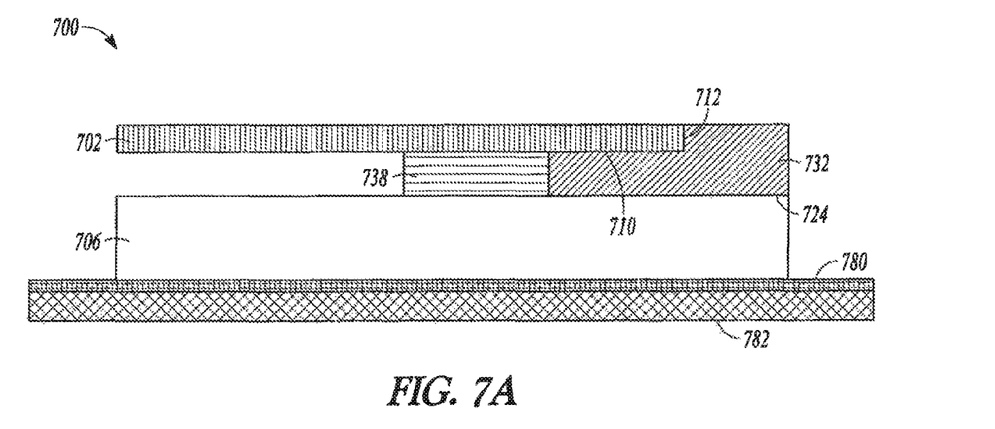
FIGS. 7A and 7B illustrate a sequential depiction of a method of forming a perimeter seal.
Figure 7B:
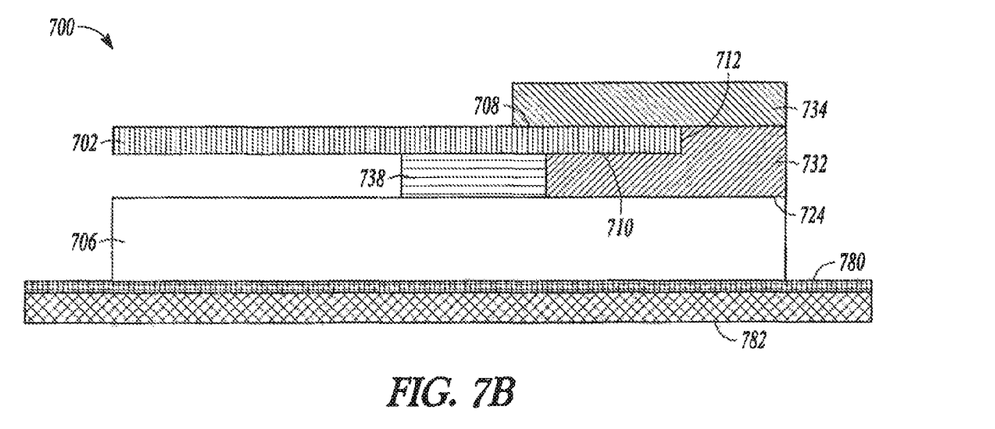

FIGS. 7A and 7B illustrate a sequential depiction of one embodiment of the present invention that includes a method of forming a perimeter seal. FIG. 7A illustrates fuel cell layer 702 and second structure 706. Second structure 706 can be, for example, a fluid manifold.

FIG. 7A shows first amount 732 of coupling material (e.g., an adhesive) which is deposited between second structure 706 and fuel cell layer 702. First amount 732 of coupling material contacts and adheres to a superior surface of second structure 706 to form second structure surface boundary area 724. First amount 732 of coupling material also contacts and adheres to an inferior surface of fuel cell layer 702 to form inferior fuel cell surface bonding area 710. First amount 732 of coupling material also contacts a lateral surface of the perimeter of fuel cell layer 702 to form perimeter fuel cell surface bonding area 712.

FIG. 7B shows second amount 734 of coupling material which is deposited over a portion of the superior surface of fuel cell layer 702 and a portion of superior surface of first amount 712. Second amount 734 of coupling material contacts and adheres to the portion of the superior surface of fuel cell layer 702 to form superior fuel cell surface bonding area 708. Second amount 734 of coupling material contacts and adheres to the portion of the superior surface of first amount 712. First amount 732 and second amount 734 of coupling material may be the same material or may be different materials, but in any event both adhere to form a perimeter coupling.

FIGS. 7A and 7B also illustrate boundary structure 738 disposed between fuel cell layer 702 and second structure 706. Boundary structure 738 prevents first portion 732 from contacting and adhering to more of the superior surface of second structure 706 or the inferior surface of fuel cell layer 702. In some embodiments, a boundary structure is an internal support structure that provides mechanical strength or other structural support to the resulting assembly, such as bond members, spacers, or collapsible columns. In other embodiments the boundary structure is a pedestal layer with ribs, as described in commonly-owned PCT International App. Pub. No. WO 2011/079377, which was filed on 23 Dec. 2010 and entitled "Fuel Cells and Fuel Cell Components Having Asymmetric Architecture and Methods Thereof," the disclosure of which is incorporated herein in its entirety by reference.

The various parts of the fuel cell assembly rest upon fixture 782 which can hold the parts in place during the dispensing process of first and second amount 732 and 734. Release layer 780, located under or inferior to second structure 706 but above or superior to fixture 782, prevents the assembly from sticking to fixture 782. Release layer 780 can be formed of various materials, such as microporous polyethylene film or porous polypropylene. Some release layer materials (e.g., polypropylene film release layers) may be reused to manufacture multiple perimeter seals for multiple fuel cell arrays.

In some embodiments, the invention includes a method of manufacturing that utilizes a relatively large amount of coupling material which is disposed between a second structure (e.g., a fluid manifold) and a fuel cell layer. The portion of disposed coupling material is large enough to both fill the space bounded by the second structure and the fuel cell layer and to overflow around the lateral surface of the peripheral edge of the fuel cell layer and flow over a portion of the superior surface of the fuel cell layer, thereby covering a portion of the fuel cell layer's top surface. A boundary structure (e.g., an internal support structure) positioned on top of the second structure and below the fuel cell layer or on top of the fuel cell layer may prevent the coupling material from spreading uncontrollably over the surface of the second structure.

Figure 8A:
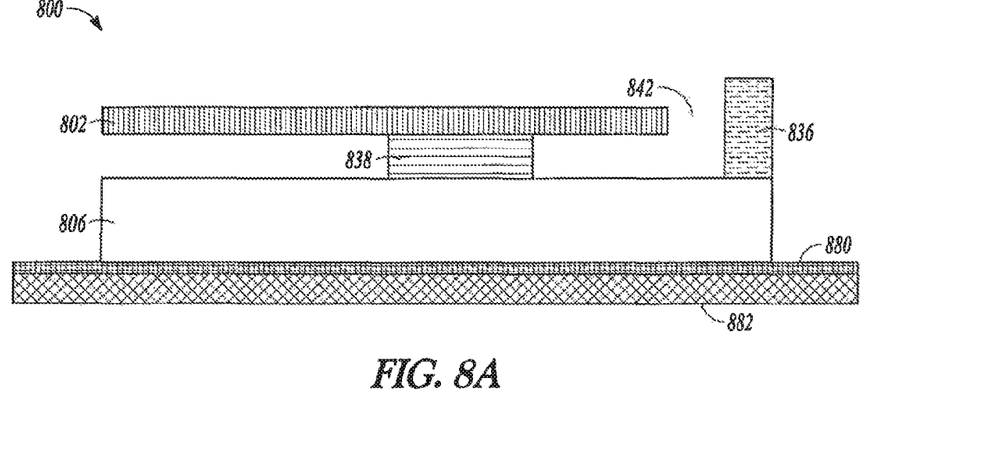
FIGS. 8A and 8B illustrate a sequential depiction of a method of manufacturing a fuel cell system having a perimeter seal.
Figure 8B:
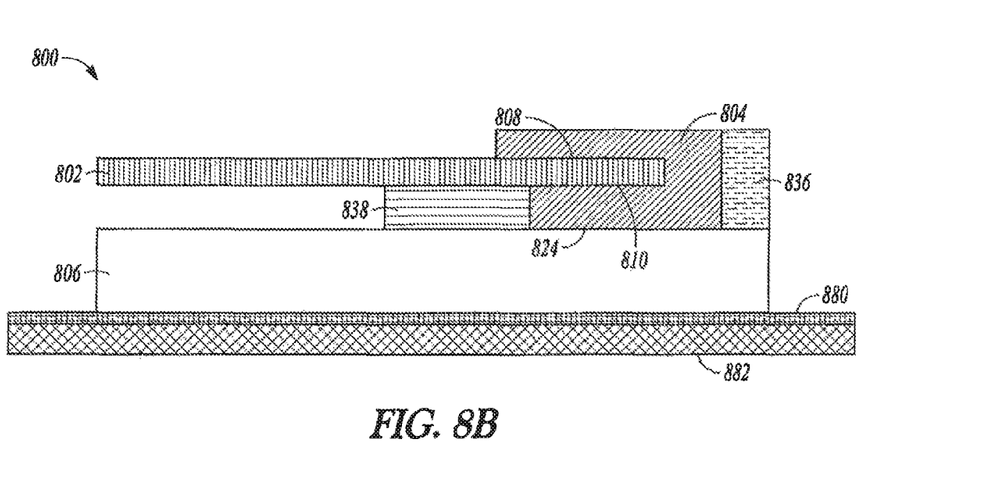

Another embodiment of the invention is illustrated in FIGS. 8A and 8B which shows a sequential depiction of a method of manufacturing fuel cell system 800 having a perimeter seal of the invention. Fuel cell layer 802 is disposed over second structure 806 and supported on boundary structure 838. Peripheral boundary structure 836 having a vertical dimension is disposed around the peripheral portion of the superior surface of second structure 806. As shown in FIG. 8A, open channel 842 is defined by a portion of the superior surface of second structure 806, boundary structures 836 and 838, and a portion of the inferior surface of fuel cell layer 802. Second structure 806 is supported on fixture 882 with release layer 880 disposed between second structure 806 and fixture 882. Boundary structure 838 could be an internal support structure or a portion of a pedestal layer.

Channel 842 defines an open space into which a coupling material may be deposited. FIG. 8B illustrates such a deposition, with coupling material 804 disposed within formerly empty channel 842. Coupling material 804 contacts and adheres to the portion of the inferior surface of fuel cell layer 802 which defined channel 842, thereby forming inferior fuel cell surface bonding area 810. Coupling material 804 contacts and adheres to the portion of the superior surface of second structure 806 which defined channel 842, thereby forming second structure surface bonding area 824. Coupling material 804 also contacts and adheres to the portion of the superior surface of fuel cell layer 802, thereby forming superior fuel cell surface bonding area 808. Note that fuel cell layer 802 is slightly smaller than second structure 806 in order to allow sufficient room for coupling material 804 to flow into channel 842 and encapsulate the peripheral portions of fuel cell 802.

Figure 9A:
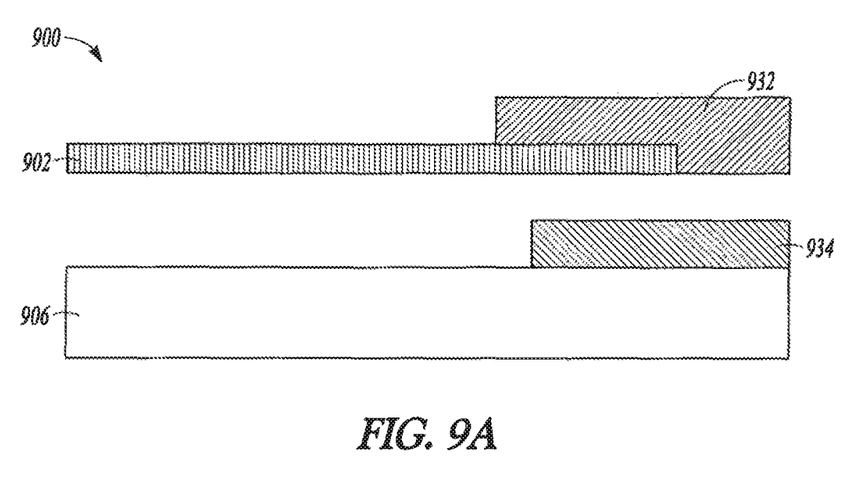
FIGS. 9A and 9B illustrate a sequential depiction of a method of forming a perimeter seal using portions of preformed coupling members.
Figure 9B:
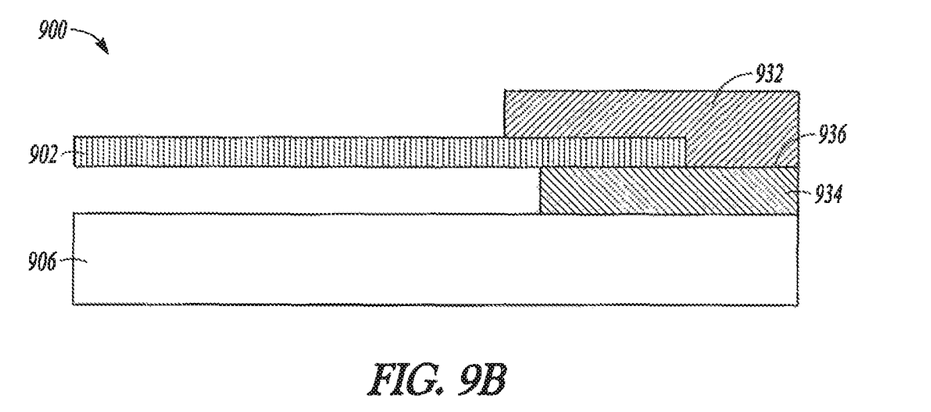

In some embodiments, the inventive coupling is formed with the use of pre-formed coupling members that are bonded into place using thin layers of adhesive material. FIGS. 9A and 9B show a sequential illustration of such an embodiment. In FIG. 9A, a portion of a coupling member in the form of first structural member 932 is disposed on a surface of fuel cell layer 902, while another portion of a pre-formed coupling member in the form of second structural member 934 is disposed on second structure 906. Members 932 and/or 934 may be held in their respective positions by the use of a thin layer of adhesive applied between member 932 and/or 934 and the respective surfaces of layer 902 or structure 906. In FIG. 9B, a coupling member or seal has been formed between fuel cell layer 902 and second structure 906 at interface 936 by coupling the two pre-formed structural members with the use of, for example, a thin layer of adhesive material.

Alternatively, coupling members may be formed entirely of adhesive material.

The use of an internal support structure may be a complementary method to increase the robustness of a fuel cell system. An internal support structure may be a non-conductive porous layer that distributes the force applied by the fluid gas pressure. Internal support structures are described in commonly-assigned PCT Application Publication No. WO 2011/079377, which was filed 23 Dec. 2010 and entitled "Fuel Cells and Fuel Cell Components Having Asymmetric Architecture and Methods Thereof," the entire disclosure of which is herein incorporated by reference.

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A fuel cell system comprising:
    a planar fuel cell layer that includes a superior fuel cell surface, an inferior fuel cell surface, and a perimeter fuel cell surface;
    a second structure, comprising a fluid manifold, positioned inferior to the inferior fuel cell surface; and
    a coupling layer, comprising an adhesive seal layer, configured to hermetically bond the planar fuel cell layer to the second structure;
    the planar fuel cell layer, the second structure and the coupling layer together defining a fluid plenum;
    wherein the coupling layer contacts and adheres to the superior fuel cell surface to form a superior fuel cell surface bonding area, the inferior fuel cell surface to form an inferior fuel cell surface bonding area, the perimeter fuel cell surface to form a perimeter fuel cell surface bonding area, and a second structure surface to form a second structure surface bonding area; and
    wherein
    the fluid plenum is configured to increase in volume when fluid flows in to the fluid plenum by one or more of the planar fuel cell layer and the second structure bowing outwards.

2. The fuel cell system of claim 1, wherein the coupling layer adheres to the entire perimeter fuel cell surface and hermetically bonds the fuel cell layer to the second structure.

3. The fuel cell system of claim 2, wherein the planar fuel cell layer, the second structure, and the coupling layer define a fluid plenum.

4. The fuel cell system of claim 3, wherein a leak path length of a fluid contained within the fluid plenum is greater than a length of the inferior fuel cell surface bonding area.

5. The fuel cell system of claim 1, wherein the superior fuel cell surface bonding area is larger than the inferior fuel cell surface bonding area.

6. The fuel cell system of claim 1, wherein the superior fuel cell surface bonding area and the inferior fuel cell surface bonding area are collectively larger than the second structure surface bonding area.

7. The fuel cell system of claim 1, further including a boundary structure disposed on a superior surface of the second structure.

8. The fuel cell system of claim 1, wherein the planar fuel cell layer is curved.

9. The fuel cell system of claim 1, further including a second fuel cell layer coupled to an inferior surface of the second structure.

10. The fuel cell system of claim 1, wherein the fuel cell layer is flexible.

11. The fuel cell system of claim 1, wherein the second structure is flexible.

12. The fuel cell system of claim 1, wherein the coupling layer includes a polyurethane, a urethane, an epoxy, a polyamide, a polyester, a pressure sensitive adhesive, an acrylic, a cyanoacrylate, or combinations thereof.

* * * * *